(12) United States Patent
Kronz

(10) Patent No.: US 10,913,082 B2
(45) Date of Patent: Feb. 9, 2021

(54) COATING APPARATUS

(71) Applicant: Michael Kronz, Verona, WI (US)

(72) Inventor: Michael Kronz, Verona, WI (US)

( * ) Notice: Subject to any disclaimer, the term of this patent is extended or adjusted under 35 U.S.C. 154(b) by 0 days.

(21) Appl. No.: 15/499,874

(22) Filed: Apr. 27, 2017

(65) Prior Publication Data

US 2018/0311690 A1    Nov. 1, 2018

(51) Int. Cl.
| | | |
|---|---|---|
| B05B 7/32 | (2006.01) | |
| B05B 7/04 | (2006.01) | |
| B05C 7/08 | (2006.01) | |
| F16L 55/18 | (2006.01) | |
| F16L 55/162 | (2006.01) | |
| B05B 5/04 | (2006.01) | |
| F16L 55/26 | (2006.01) | |
| B05B 3/10 | (2006.01) | |
| F16L 101/16 | (2006.01) | |
| E03F 3/06 | (2006.01) | |
| B05B 1/30 | (2006.01) | |

(52) U.S. Cl.
CPC .............. B05B 7/32 (2013.01); B05B 3/1007 (2013.01); B05B 5/0403 (2013.01); B05B 7/04 (2013.01); B05C 7/08 (2013.01); F16L 55/162 (2013.01); F16L 55/18 (2013.01); F16L 55/26 (2013.01); *B05B 1/306* (2013.01); *B05B 7/0408* (2013.01); *E03F 2003/065* (2013.01); *F16L 2101/16* (2013.01)

(58) Field of Classification Search
CPC ........... B05B 7/32; B05B 5/0403; B05B 7/04; B05B 3/02; B05B 3/10; B05B 3/1007; B05B 3/1014; B05B 3/1035; B05B 3/1064; B05C 7/08; F16L 55/162; F16L 55/18; F16L 2101/16; E03F 2003/065
USPC ...... 239/214.25, 215, 216, 222.11, 223, 408, 239/412, 418, 432
See application file for complete search history.

(56) References Cited

U.S. PATENT DOCUMENTS 3,034,729 A * 5/1962 Gray ..................... B05C 7/02
118/306
3,930,061 A * 12/1975 Scharfenberger ..... B29C 41/006
239/3

\* cited by examiner

*Primary Examiner* — Christopher S Kim
(74) *Attorney, Agent, or Firm* — David J. Archer

(57) ABSTRACT

A coating apparatus is disclosed for applying an activated coating onto an internal surface of a conduit, the coating being activated by mixing at least a first and a second component. The apparatus includes a high-pressure mix gun for mixing the at least first and second components such that the activated coating is generated. A rotary atomizer is operatively connected to and cooperates with the high pressure mix gun for receiving the activated coating from the high pressure mix gun. The rotary atomizer cooperates with the activated coating such that the activated coating is atomized so that application of the atomized activated coating onto the internal surface of the conduit is permitted.

17 Claims, 4 Drawing Sheets

COATING APPARATUS

CROSS REFERENCE TO RELATED APPLICATION

The present application is a complete application filed pursuant to provisional patent application U.S. Ser. No. 62/330,047 filed Apr. 29, 2016. All of the disclosure of U.S. Ser. No. 62/330,047 is incorporated herein by reference.

FIELD OF THE INVENTION

Background of the Invention

The present invention relates to a coating apparatus.

More specifically, the present invention relates to a coating apparatus for applying an activated coating onto an internal surface of a conduit.

Background Information

The coating of an internal surface of a conduit such as a water supply line or a sewage drainage line or the like presents many problems. For example, when a water supply line deteriorates to the point of leaking, valuable water is wasted and there is a danger that contaminants will seep into the supply line thereby posing potential health hazards. Also, in the case of a municipal sewage line, if the internal surface becomes corroded, there is a very definite possibility of leakage of raw sewage into the environment thus producing a health and environmental hazard.

However, repairing such pipelines not only requires detection of such leakage but often the digging up of the pipeline and replacement thereof with a new line. Obviously, this procedure becomes extremely difficult and costly when the pipe system runs underground through a city or other municipality.

More recently, proposals have been made which include repairing the pipe in situ by internally coating the pipe with an impermeable coating material. Usually, this internal coating process is preceded by a procedure which includes cleaning and preparing the internal surface of the pipe so that it will reliably receive the applied protective coating.

Robotic machines have been developed for the application of activated coatings. Such activated coatings require the mixing of at least two components and the application of such mixed components almost immediately to the surface to be coated. The activated coating may be applied in a rotary motion so that the coating progressively coats the internal surface as the robotically controlled machine progresses through the pipeline.

Typically, the activated coating mixes during passage thereof through a static mixer so that the mixed coating can be supplied to a rotating coating application head or the like. However, using this method, the whole coating operation must of necessity be carried out as a single operation because of the rapid set time of the activated coating. For example, in these prior art machines, if the coating operation is interrupted, it becomes necessary to retract the machine to the starting point of the coating operation. The static mixer must then be removed and discarded. Also, the coating head and any plumbing or components used to deliver the pre-mixed material must be immediately flushed with solvent to remove all of the residual activated coating from the equipment. Furthermore, such used solvent must then be collected and disposed of in an environmentally safe manner.

U.S. Pat. No. 6,745,955 to Kronz discloses a robotic machine for internally coating pipes including a purging system for removing activated coating material from the machine after the coating process has been completed. However, the present invention provides a robotic apparatus for internally coating pipes having a very small internal diameter of approximately 3 inches and virtually eliminates the need for a purging system. All of the subject matter of the aforementioned U.S. Pat. No. 6,745,955 is incorporated herein by reference.

The present invention provides a unique arrangement which includes a high pressure mixing gun which intimately mixes the coating components to activate the same. The high-pressure mixed material then passes through a larger diameter exit port converting it to a low-pressure stream. The activated coating is thereafter fed into a conical design spin-head which is constantly rotated at a high speed. This atomizes the activated coating and centrifugally delivers it to the pipe wall interior for a smooth and consistent application of the coating.

Therefore, a primary objective of the present invention is the provision of a coating apparatus which combines a high pressure mixing gun with a rotary atomizer.

Another objective of the present invention is the provision of a coating apparatus which combines a high pressure mixing gun with an atomizer so that the system can be started and stopped at will without partial tear-down and/or solvent flushing.

A further object of the present invention is the provision of a coating apparatus which combines a high pressure mixing gun with an atomizer which provides an enhanced coating which is both smooth and uniform when the coating is applied onto an internal surface of a pipeline.

Another object of the present invention is the provision of a coating apparatus which provides a smooth and uniform coating when the coating is applied onto an internal surface of a very small diameter pipeline such as a 3 inch internal diameter pipeline.

Yet a further object of the present invention is the provision of coating apparatus which avoids the need for purging activated coating thus enabling a user of the apparatus to stop the coating operation and later continue with the coating operation without the need for the introduction of a solvent to flush out the activated coating.

Other features and advantages of the present invention will be readily apparent to those skilled in the art by a consideration of the detailed description of a preferred embodiment of the present invention contained herein.

SUMMARY OF THE INVENTION

The present invention relates to a coating apparatus for applying an activated coating onto an internal surface of a conduit, the coating being activated by mixing at least a first and a second component. The apparatus includes a high-pressure mix gun for mixing the at least first and second components such that the activated coating is generated. A rotary atomizer is operatively connected to and cooperates with the high pressure mix gun for receiving the activated coating from the high pressure mix gun. The rotary atomizer cooperates with the activated coating such that the activated coating is atomized so that application of the atomized activated coating onto the internal surface of the conduit is permitted.

The high-pressure mix gun includes a housing defining a first and a second inlet. The first inlet is in fluid communication with the first component.

Also, the second inlet is in fluid communication with the second component.

Moreover, the housing defines a mixing chamber which is in fluid communication with the first and the second inlet.

Additionally, the housing defines a bore having a first and a second end, the bore being in fluid communication with the mixing chamber.

A rod has a first and a second extremity, the rod slidably extending through the bore. The arrangement is such that when the rod is disposed in a first axial disposition thereof relative to the bore, a flow of the activated coating past the first end of the bore is permitted. However, when the rod is disposed in a second axial disposition thereof relative to the bore, a flow of the activated coating past the first end of the bore is inhibited.

The first extremity of the rod cooperates with the first end of the bore such that when the rod is in the second axial disposition thereof, the first extremity of the rod seats relative to the first end of the bore for sealing the first end of the bore for preventing the flow of activated coating out of the housing.

Also, a body is disposed axially spaced relative to the housing, the body defining an enclosure for the reception therein of the second extremity of the rod.

The enclosure has an inner surface of cylindrical configuration.

Additionally, a piston is secured to the second extremity of the rod, the piston sealingly cooperating with the inner surface of the enclosure. The arrangement is such that axial movement of the piston within the enclosure is permitted.

The enclosure has a first and a second compartment such that the piston is disposed between the first and a second compartments.

Also, a source of pressurized fluid is selectively connected to the first compartment for moving the piston and the rod axially within the enclosure such that the first extremity of the rod is disposed in the first disposition thereof for permitting the flow of activated coating.

Moreover, the source of pressurized fluid is selectively connected to the second compartment for moving the piston and the rod axially within the enclosure such that the first extremity of the rod is disposed in the second disposition thereof for inhibiting the flow of activated coating.

A first connector is connected to the first compartment for connecting the first compartment to the source of pressurized fluid.

Also, a second connector is connected to the second compartment for connecting the second compartment to the source of pressurized fluid.

A control device is disposed remote from the enclosure for selectively controlling connection of the source of pressurized fluid to the first and the second connectors for controlling axial movement of the rod between the first and the second dispositions thereof.

Furthermore, a first pump is disposed remote from the first inlet of the high-pressure mix gun. The first pump has an inlet port and an outlet port, the outlet port of the first pump being connected to the first inlet of the high-pressure mix gun. The first pump is used to pressurize the first component to a pressure within a range of 1500 to 3500 pound per square inch.

A second pump is disposed remote from the second inlet of the high-pressure mix gun. The second pump has a further inlet port and a further outlet port. The further outlet port of the second pump is connected to the second inlet of the high-pressure mix gun. The second pump pressurizes the second component to a pressure within a range of 1500 to 3500 pound per square inch.

Additionally, the rotary atomizer has a rearward portion and a forward portion.

The rearward portion of the rotary atomizer defines a recess which cooperates with and is supported by the high-pressure mix gun for permitting rotation of the rotary atomizer relative to the high-pressure mix gun so that the rotary atomizer rotates about a longitudinal axis which extends through the high-pressure mix gun.

Also, the forward portion of the rotary atomizer defines an inside surface of conical shaped configuration.

The conical shaped configuration of the inside surface of the forward portion has an apex which is disposed in a vicinity of the activated coating generated by the high-pressure mix gun. The arrangement is such that the activated coating generated by the high-pressure mix gun flows from the high-pressure mix gun through an aperture defined by the apex of the inside surface, so that rotation of the inside surface guides and spreads the activated coating so that the activated coating is applied to the internal surface of the conduit.

A bearing is disposed between the recess of the rearward portion of the rotary atomizer and the high-pressure mix gun for facilitating support of the rotary atomizer and the rotation thereof about the high-pressure mix gun.

More specifically, the bearing includes a first annular row of ball bearings. A second annular row of ball bearings is disposed axially spaced relative to the first annular row of ball bearings.

Also, a motor is drivingly connected to the rotary atomizer for rotating the rotary atomizer about the high-pressure mix gun.

The high-pressure mix gun is disposed between the motor and the rotary atomizer.

Moreover, the apparatus further includes a drive shaft having a first and a second end, the motor being drivingly connected to the second end of the drive shaft.

A drive belt cooperates with the first end of the drive shaft such that the drive belt is driven by the drive shaft. The drive belt extends around the rotary atomizer such that the drive belt drivingly cooperates with the rotary atomizer for rotating the same about the high-pressure mix gun.

Furthermore, a plate is provided for deflecting the activated coating towards the conical shaped configuration of the inside surface such that the apex of the conical shaped inside surface is disposed between the plate and the high-pressure mix gun.

The plate is secured to the forward portion of the rotary atomizer so that activated coating flows from the high-pressure mix gun through the aperture and is deflected and atomized by the rotating plate onto the rotating conical shaped configuration of the inside surface of the forward portion. The arrangement is such that rotation of the forward portion urges the atomized activated coating to move by centrifugal force and guided by the inside surface for application onto the internal surface of the conduit to be coated.

Many modifications and variations of the present invention will be readily apparent to those skilled in the art by a consideration of the detailed description contained hereinafter taken in conjunction with the annexed drawings which show a preferred embodiment of the present invention. However, such modifications and variations fall within the spirit and scope of the present invention as defined by the appended claims.

Included in such modifications would be the provision of a purging system if required for certain types of application. The present invention also envisages incorporation of the mixing arrangement disclosed in the aforementioned U.S. Pat. No. 6,745,955 to Kronz.

BRIEF DESCRIPTION OF THE DRAWINGS

Similar reference characters refer to similar parts throughout the views of the drawings.

DETAILED DESCRIPTION OF THE DRAWINGS

Figure 1:
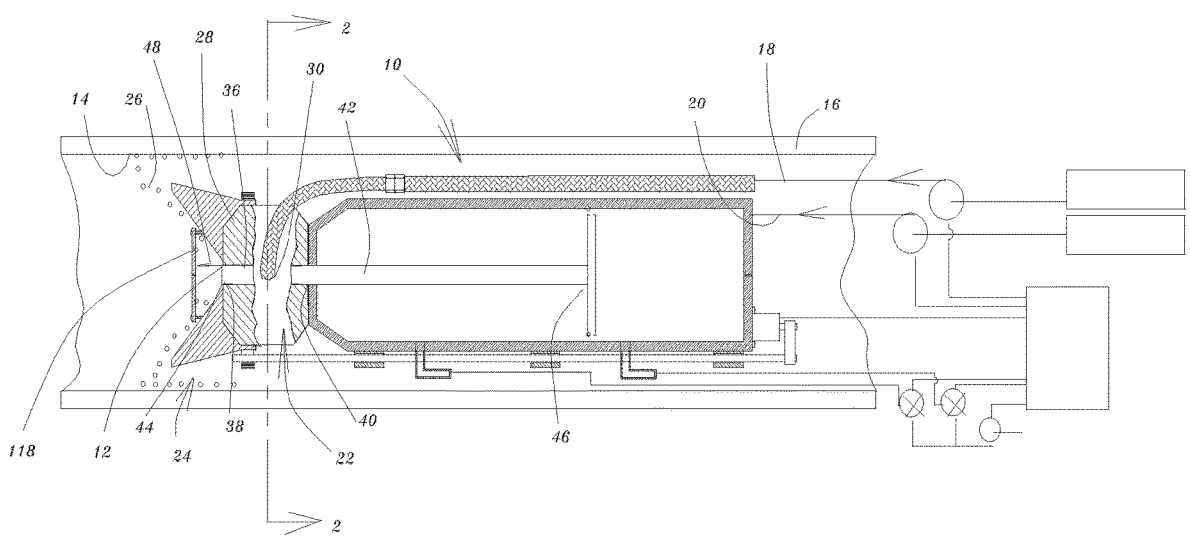
FIG. 1 is a side sectional view partially in section of a coating apparatus according to the present invention for applying an activated coating onto an internal surface of a conduit.

FIG. 1 is a side sectional view partially in section of a coating apparatus generally designated 10 according to the present invention for applying an activated coating 12 onto an internal surface 14 of a conduit 16. As shown in FIG. 1, the coating 12 is activated by mixing at least a first and a second component 18 and 20 respectively. The apparatus 10 includes a high-pressure mix gun generally designated 22 for mixing the at least first and second components 18 and 20 respectively such that the activated coating 12 is generated. The high-pressure mix gun 22 is of a type disclosed in detail in U.S. Pat. No. 3,799,403 assigned to Ransburg Corporation of Indianapolis, Ind. All of the disclosure of U.S. Pat. No. 3,799,403 is incorporated herein by reference. Additionally, the high-pressure mix gun 22 is of a type disclosed in detail in U.S. Pat. No. 7,527,172 assigned to Graco Minnesota Inc. of Minneapolis Minn. All of the disclosure of U.S. Pat. No. 7,527,172 is incorporated herein by reference. A rotary atomizer generally designated 24 such as a rotary atomizer spin head is operatively connected to and cooperates with the high pressure mix gun 22 for receiving the activated coating 12 from the high pressure mix gun 22. The rotary atomizer 24 cooperates with the activated coating 12 such that the activated coating 12 is atomized so that application of the atomized activated coating 26 onto the internal surface 14 of the conduit 16 is permitted.

Figure 2:
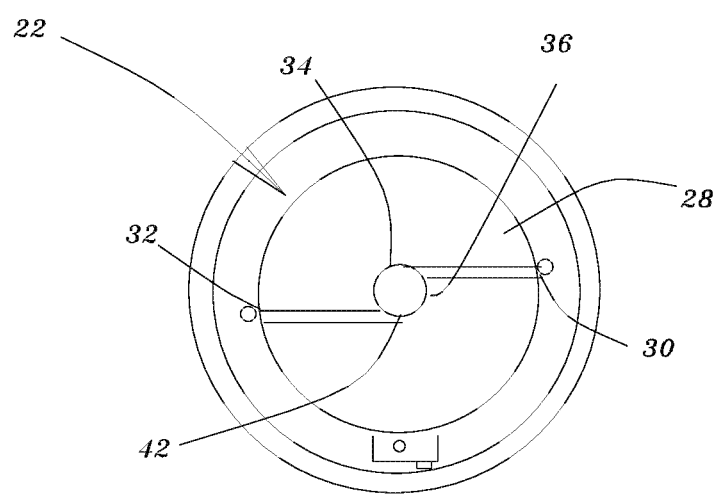
FIG. 2 is a sectional view taken on the line 2-2 of FIG. 1.

FIG. 2 is a sectional view taken on the line 2-2 of FIG. 1. As shown in FIG. 2, the high-pressure mix gun 22 includes a housing 28 defining a first and a second inlet 30 and 32 respectively. The first inlet 30 is in fluid communication with the first component 18.

Also, the second inlet 32 is in fluid communication with the second component 20.

The housing 28 defines a mixing chamber 34 which is in fluid communication with the first inlet 30 and the second inlet 32.

As shown in FIG. 1, the housing 28 defines a bore 36 having a first and a second end 38 and 40 respectively, the bore 36 being in fluid communication with the mixing chamber 34 shown in FIG. 2.

As shown in FIG. 1, a rod 42 has a first and a second extremity 44 and 46 respectively, the rod 42 slidably extending through the bore 36. The arrangement is such that when the rod 42 is disposed in a first axial disposition thereof relative to the bore 36 as shown in FIG. 1, a flow as indicated by the arrow 48 of the activated coating 12 past the first end 38 of the bore 36 is permitted.

Figure 3:
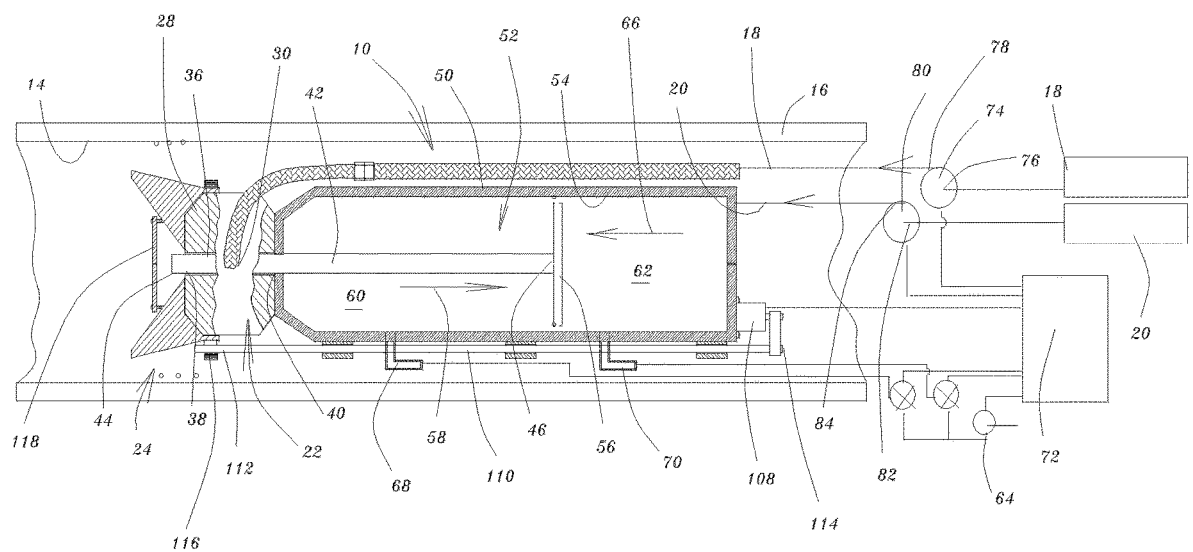
FIG. 3 is a similar view to that shown in FIG. 1 but shows the rod disposed in a second axial disposition thereof relative to the bore.

FIG. 3 is a similar view to that shown in FIG. 1 but shows the rod 42 disposed in a second axial disposition thereof relative to the bore 36. As shown in FIG. 3, when the rod 42 is disposed in the second axial disposition thereof relative to the bore 36 with the rod 42 moved axially to the left, the flow 48 of the activated coating 12 past the first end 38 of the bore 36 is inhibited.

The first extremity 44 of the rod 42 cooperates with the first end 38 of the bore 36 such that when the rod 42 is in the second axial disposition thereof as shown in FIG. 3, the first extremity 44 of the rod 42 seats relative to the first end 38 of the bore 36 for sealing the first end 38 of the bore 36 for preventing the flow 48 of activated coating 12 out of the housing 28.

Also, a body 50 is disposed axially spaced relative to the housing 28, the body 50 defining an enclosure generally designated 52 for the reception therein of the second extremity 46 of the rod 42.

The enclosure 52 has an inner surface 54 of cylindrical configuration.

Additionally, a piston 56 is secured to the second extremity 46 of the rod 42, the piston 56 sealingly cooperating with the inner surface 54 of the enclosure 52. The arrangement is such that axial movement as indicated by the arrow 58 of the piston 56 within the enclosure 52 is permitted.

The enclosure 52 has a first and a second compartment 60 and 62 respectively such that the piston 56 is disposed between the first and a second compartments 60 and 62 respectively.

Also, a source of pressurized fluid such as pressurized air 64 is selectively connected to the first compartment 60 for moving the piston 56 and the rod 42 axially within the enclosure 52 as indicated by the arrow 58 such that the first extremity 44 of the rod 42 is disposed in the first disposition thereof as shown in FIG. 1 for permitting the flow 48 of activated coating 12.

Moreover, the source of pressurized fluid 64 is selectively connected to the second compartment 62 for moving the piston 56 and the rod 42 axially within the enclosure 52 as indicated by the arrow 66 such that the first extremity 44 of the rod 42 is disposed in the second disposition thereof as shown in FIG. 3 for inhibiting the flow 48 of activated coating 12.

A first connector 68 is connected to the first compartment 60 for connecting the first compartment 60 to the source of pressurized fluid 64.

Also, a second connector 70 is connected to the second compartment 62 for connecting the second compartment 62 to the source of pressurized fluid 64.

A control device 72 is disposed remote from the enclosure 52 for selectively controlling connection of the source of pressurized fluid 64 to the first and the second connectors 68 and 70 respectively for controlling axial movement of the rod 42 between the first and the second dispositions thereof shown in FIGS. 1 and 3 respectively.

Furthermore, a first pump 74 is disposed remote from the first inlet 30 of the high-pressure mix gun 22. The first pump 74 has an inlet port 76 and an outlet port 78, the outlet port 78 of the first pump 74 being connected to the first inlet 30 of the high-pressure mix gun 22. The first pump 74 is used to pressurize the first component 18 to a pressure within a range of 1500 to 3500 pound per square inch.

A second pump 80 is disposed remote from the second inlet 32 of the high-pressure mix gun 22 as shown in FIG.

2. The second pump 80 has a further inlet port 82 and a further outlet port 84. The further outlet port 84 of the second pump 80 is connected to the second inlet 32 of the high-pressure mix gun 22 as shown in FIG. 2. The second pump 80 pressurizes the second component 20 to a pressure within a range of 1500 to 3500 pound per square inch.

Figure 4:
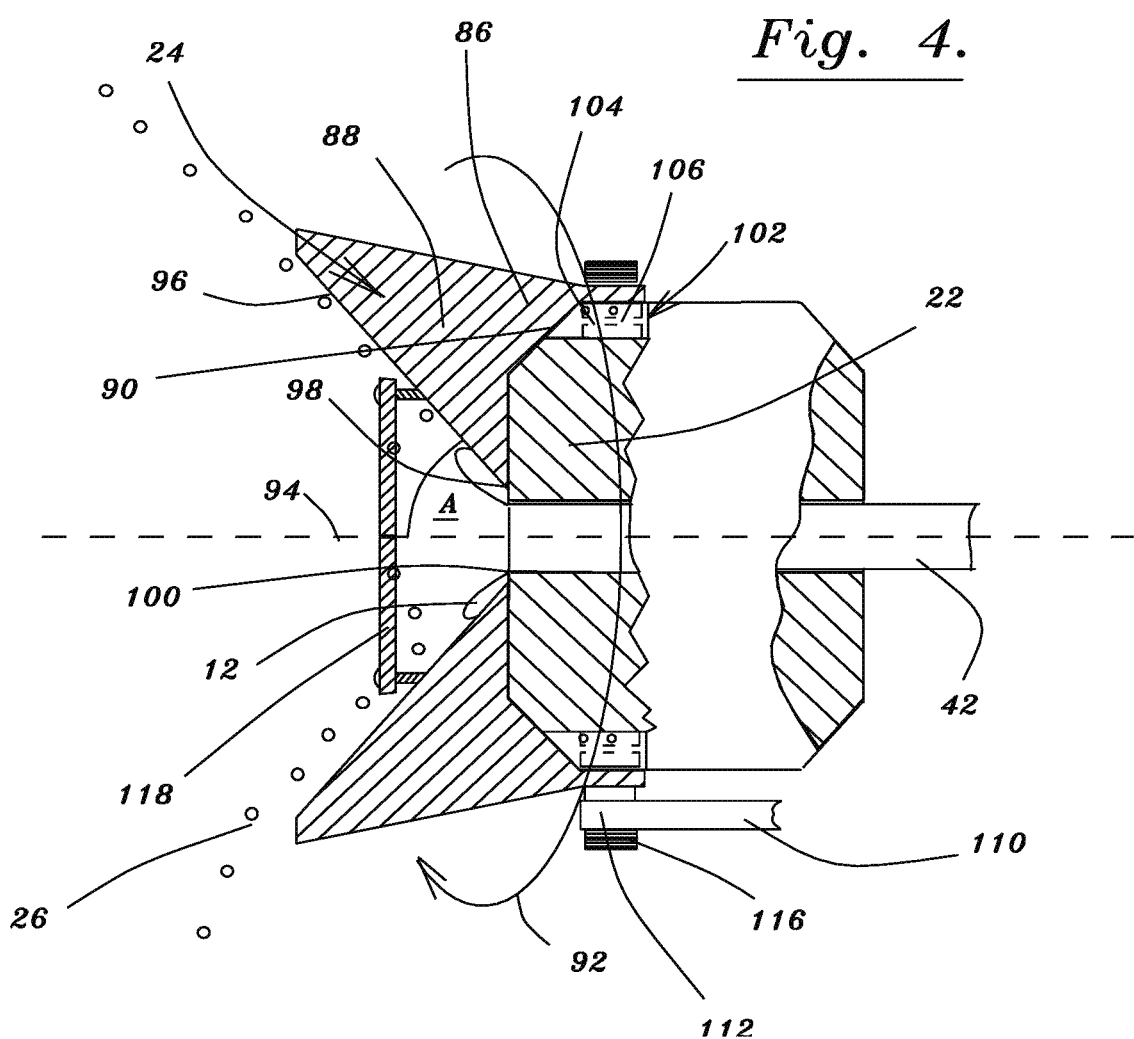
FIG. 4 is an enlarged view of the rotary atomizer shown in FIG. 1.

FIG. 4 is an enlarged view of the rotary atomizer 24 shown in FIG. 1. As shown in FIG. 4, the rotary atomizer 24 has a rearward portion generally designated 86 and a forward portion generally designated 88.

The rearward portion 86 of the rotary atomizer 24 defines a recess 90 which cooperates with and is supported by the high-pressure mix gun 22 for permitting rotation as indicated by the arrow 92 of the rotary atomizer 24 relative to the high-pressure mix gun 22 so that the rotary atomizer 24 rotates about a longitudinal axis 94 which extends through the high-pressure mix gun 22.

Moreover, the forward portion 88 of the rotary atomizer 24 defines an inside surface 96 of conical shaped configuration.

The conical shaped configuration of the inside surface 96 of the forward portion 88 has an apex 98 which is disposed in a vicinity of the activated coating 12 generated by the high-pressure mix gun 22. The arrangement is such that the activated coating generated by the high-pressure mix gun 12 flows from the high-pressure mix gun 22 through an aperture 100 defined by the apex 98 of the inside surface 96, so that rotation as indicated by the arrow 92 of the inside surface 96 guides and spreads the activated coating 12 so that the activated coating 12 is applied to the internal surface 14 of the conduit 16 as shown in FIG. 1.

A bearing generally designated 102 is disposed between the recess 90 of the rearward portion 86 of the rotary atomizer 24 and the high-pressure mix gun 22 for facilitating support of the rotary atomizer 24 and rotation thereof about the high-pressure mix gun 22.

More specifically, the bearing 102 includes a first annular row of ball bearings 104. A second annular row of ball bearings 106 is disposed axially spaced relative to the first annular row of ball bearings 104.

As shown in FIG. 3, a motor 108 is drivingly connected to the rotary atomizer 24 for rotating the rotary atomizer 24 about the high-pressure mix gun 22 as indicated by the arrow 92 shown in FIG. 4.

The high-pressure mix gun 22 is disposed between the motor 108 and the rotary atomizer 24.

The apparatus 10 further includes a drive shaft 110 having a first and a second end 112 and 114 respectively, the motor 108 being drivingly connected to the second end 114 of the drive shaft 110.

A drive belt 116 cooperates with the first end 112 of the drive shaft 110 such that the drive belt 116 is driven by the drive shaft 110. The drive belt 116 extends around the rotary atomizer 24 such that the drive belt 116 drivingly cooperates with the rotary atomizer 24 for rotating the same about the high-pressure mix gun 22 as indicated by the arrow 92.

Furthermore, a plate 118 is provided for deflecting the activated coating 12 towards the conical shaped configuration of the inside surface 96 such that the apex 98 is disposed between the plate 118 and the high-pressure mix gun 22.

As shown in FIG. 4, the plate 118 is secured to the forward portion 88 of the rotary atomizer 24 so that activated coating 12 flows from the high-pressure mix gun 22 through the aperture 100 and is deflected and atomized by the plate 118 onto the conical shaped configuration of the inside surface 96 of the forward portion 88. The arrangement is such that rotation of the forward portion 88 urges the atomized activated coating 26 to move by centrifugal force and guided by the inside surface 96 for application onto the internal surface 14 of the conduit 16 to be coated.

In operation of the apparatus according to the present invention, the apparatus 10 is inserted into the conduit 16 and the control device 72 is programmed to advance the apparatus 10 through the conduit 16. The control device 72 also actuates both of the pumps 74 and 80 so that high pressure components 18 and 20 are fed towards the mixing chamber 34. The control device 72 selectively connects the source of pressurized fluid such as pressurized air to the first compartment 60 so that the activated coating 12 flows from the mixing chamber 34 to the rotary atomizer 24. The control device 72 also energizes the motor 108 so that the rotary atomizer rotates for applying the atomized activated coating onto the internal surface 14 of the conduit 16.

Because the distance between the mixing chamber 34 and the inside surface 96 of the rotary atomizer is very small, the inventor has discovered that surprisingly, there is no need to purge the apparatus after use and that the coating operation can be interrupted if necessary and restarted without any need for the introduction of any solvents or purging equipment for cleaning the apparatus during or after a coating operation.

Additionally, the inside surface 96 is very steep relative to the longitudinal axis 94. More specifically, the angle "A" defined between the inside surface 96 and the longitudinal axis 94 is at least 45 degrees. Because this angle "A" is steep, the residence time of the atomized activated material 26 guided by the inside surface 96 is minimized thus reducing the amount of material 26 that is able adhere to this inside surface 96 so that there is little or no build up of material 26 on such inside surface 96.

Additionally, the motor 108 rotates the inside surface 96 within a range 3000 to 7000 rpm and preferably at 3500 rpm.

The present invention provides a unique apparatus that permits the application of activated coating to the inside surface of a very small internal diameter pipe and without any need for purging activated coating from the apparatus during any interruption of the coating operation or after completion of the coating operation.

What I claim is:

1. A coating apparatus for applying an activated coating onto an internal surface of a conduit, the coating being activated by mixing at least a first component and a second component, said apparatus comprising:
   a high-pressure mix gun for mixing the at least first and second components such that the activated coating is generated;
   said high-pressure mix gun including:
      a housing which defines a bore having a first end and a second end;
      a rod having a first extremity and a second extremity, said rod slidably extending through said bore, said rod defining a mixing chamber for mixing together the at least first and second components, said rod being controllably movable axially along said bore so that said rod and said mixing chamber are controllably moved between a first disposition and a second disposition such that when said mixing chamber is in said first disposition, said mixing chamber is supplied with at least the first component and the second component so that at least the first component and the second component are mixed together within said mixing chamber for generating the activated coating such that a flow of the activated coating flows from said mixing chamber towards the internal surface of the conduit and when said mixing chamber is disposed in said second disposition thereof, said mixing chamber is disconnected from at least the first component and the second component so that said flow of the activated coating is inhibited thereby avoiding any need for purging the coating apparatus with inflammable and thus potentially lethal and environmentally polluting purging solvent; and a rotary atomizer operatively connected to and cooperating with said high pressure mix gun for receiving the activated coating from said high pressure mix gun, said rotary atomizer defining an inside surface of conical shaped configuration operatively disposed relative to said high pressure mix gun such that when said mixing chamber is disposed in said first disposition thereof, said inside surface of conical shaped configuration receives the activated coating from said high pressure mix gun so that said flow of the activated coating flows from said high pressure mix gun along said inside surface of conical shaped configuration such that the activated coating is applied to the internal surface of the conduit.

2. A coating apparatus as set forth in claim 1 wherein said high-pressure mix gun includes:
   a first inlet defined by said housing;
   a second inlet defined by said housing;
      said first inlet being in fluid communication with the first component;
      said second inlet being in fluid communication with the second component;
      said mixing chamber being in fluid communication with said first inlet and said second inlet;
      said rod when disposed in said first axial disposition thereof permitting said flow of the activated coating past said first end of said bore, and when said rod is disposed in a said second axial disposition thereof, said flow of the activated coating past said first end of said bore is inhibited.

3. A coating apparatus as set forth in claim 2 wherein said first extremity of said rod cooperates with said first end of said bore such that when said rod is in said second axial disposition thereof, said first extremity of said rod seats relative to said first end of said bore for sealing said first end of said bore for preventing said flow of activated coating out of said housing.

4. A coating apparatus as set forth in claim 2 further including:
   a body disposed axially spaced relative to said housing, said body defining an enclosure for the reception therein of said second extremity of said rod;
      said enclosure having an inner surface of cylindrical configuration;
   a piston secured to said second extremity of said rod, said piston sealingly cooperating with said inner surface of said enclosure such that axial movement of said piston within said enclosure is permitted.

5. A coating apparatus as set forth in claim 4 wherein said enclosure has a first and a second compartment such that said piston is disposed between said first and a second compartments;
   a source of pressurized fluid being selectively connected to said first compartment for moving said piston and said rod axially within said enclosure such that said first extremity of said rod is disposed in said first disposition thereof for permitting said flow of activated coating;
   said source of pressurized fluid being selectively connected to said second compartment for moving said piston and said rod axially within said enclosure such that said first extremity of said rod is disposed in said second disposition thereof for inhibiting said flow of activated coating.

6. A coating apparatus as set forth in claim 5 further including:
   a first connector connected to said first compartment for connecting said first compartment to said source of pressurized fluid;
   a second connector connected to said second compartment for connecting said second compartment to said source of pressurized fluid;
   a control device disposed remote from said enclosure for selectively controlling connection of said source of pressurized fluid to said first and said second connectors for controlling axial movement of said rod between said first and said second dispositions thereof.

7. A coating apparatus as set forth in claim 2 further including:
   a first pump disposed remote from said first inlet of said high-pressure mix gun, said first pump having an inlet port and an outlet port, said outlet port of said first pump being connected to said first inlet of said high-pressure mix gun, said first pump pressurizing the first component to a pressure within a range of 1500 to 3500 pounds per square inch;
   a second pump disposed remote from said second inlet of said high-pressure mix gun, said second pump having a further inlet port and a further outlet port, said further outlet port of said second pump being connected to said second inlet of said high-pressure mix gun, said second pump pressurizing the second component to a pressure within a range of 1500 to 3500 pounds per square inch.

8. A coating apparatus as set forth in claim 1 wherein said rotary atomizer has a rearward portion and a forward portion;
   said rearward portion of said rotary atomizer defining a recess which cooperates with and is supported by said high-pressure mix gun for permitting rotation of said rotary atomizer relative to said high-pressure mix gun, said rotary atomizer rotating about a longitudinal axis which extends through said high-pressure mix gun.

9. A coating apparatus as set forth in claim 8 wherein forward portion of said rotary atomizer defines said inside surface of conical shaped configuration;
   said conical shaped configuration of said inside surface of said forward portion having an apex which is disposed such that the activated coating generated by said high-pressure mix gun flows from said high-pressure mix gun through an aperture defined by said apex of said inside surface, so that rotation of said inside surface guides and spreads the activated coating so that the activated coating is applied to the internal surface of the conduit.

10. A coating apparatus as set forth in claim 9 further including:
    a plate for deflecting the activated coating towards said conical shaped configuration of said inside surface such that said apex is disposed between said plate and said high-pressure mix gun.

11. A coating apparatus as set forth in claim 10 wherein said plate is secured to said forward portion of said rotary atomizer so that activated coating flows from said high-pressure mix gun through said aperture and is deflected and atomized by said plate onto said conical shaped configuration of said inside surface of said forward portion and so that rotation of said forward portion urges said atomized activated coating to move by centrifugal force and guided by said inside surface for application onto the internal surface of the conduit to be coated.

12. A coating apparatus as set forth in claim 8 further including:

a bearing disposed between said recess of said rearward portion of said rotary atomizer and said high-pressure mix gun for facilitating support of said rotary atomizer and rotation thereof about said high-pressure mix gun.

13. A coating apparatus as set forth in claim 12 wherein said bearing includes:

a first annular row of ball bearings;

a second annular row of ball bearings disposed axially spaced relative to said first annular row of ball bearings.

14. A coating apparatus as set forth in claim 1 further including:

a motor drivingly connected to said rotary atomizer for rotating said rotary atomizer about said high-pressure mix gun.

15. A coating apparatus as set forth in claim 14 wherein said high-pressure mix gun is disposed between said motor and said rotary atomizer;

said apparatus further including:

a drive shaft having a first and a second end, said motor being drivingly connected to said second end of said drive shaft;

a drive belt cooperating with said first end of said drive shaft such that said drive belt is driven by said drive shaft, said drive belt extending around said rotary atomizer such that said drive belt drivingly cooperates with said rotary atomizer for rotating the same about said high-pressure mix gun.

16. A coating apparatus for applying an activated coating onto an internal surface of a conduit, the coating being activated by mixing at least a first component and a second component, said apparatus comprising:

a high-pressure mix gun for mixing the at least first and second components such that the activated coating is generated;

said high-pressure mix gun including:

a housing which defines a bore having a first end and a second end;

a rod having a first extremity and a second extremity, said rod slidably extending through said bore, said rod defining a mixing chamber for mixing together the at least first and second components, said rod being controllably movable axially along said bore so that said rod and said mixing chamber are controllably moved between a first disposition and a second disposition such that when said mixing chamber is in said first disposition, said mixing chamber is supplied with the at least first and second components so that the at least first and second components are mixed together within said mixing chamber for generating the activated coating such that a flow of the activated coating flows from said mixing chamber towards the internal surface of the conduit and when said mixing chamber is disposed in said second disposition thereof, said mixing chamber is disconnected from the at least first and second components so that said flow of the activated coating is inhibited thereby avoiding any need for purging the coating apparatus with inflammable and thus potentially lethal and environmentally polluting purging solvent;

a rotary atomizer operatively connected to and cooperating with said high pressure mix gun for receiving the activated coating from said high pressure mix gun, said rotary atomizer defining an inside surface of conical shaped configuration operatively disposed relative to said high pressure mix gun such that when said mixing chamber is disposed in said first disposition thereof, said inside surface of conical shaped configuration receives the activated coating from said high pressure mix gun so that said flow of the activated coating flows from said high pressure mix gun along said inside surface of conical shaped configuration such that the activated coating is applied to the internal surface of the conduit;

said rotary atomizer having a rearward portion and a forward portion;

said rearward portion of said rotary atomizer defining a recess which cooperates with and is supported by said high-pressure mix gun for permitting rotation of said rotary atomizer relative to said high-pressure mix gun, said rotary atomizer rotating about a longitudinal axis which extends through said high-pressure mix gun;

said forward portion of said rotary atomizer defining an inside surface of conical shaped configuration; and said conical shaped configuration of said inside surface of said forward portion having an apex which is disposed such that the activated coating generated by said high-pressure mix gun flows from said high-pressure mix gun through an aperture defined by said apex of said inside surface, so that rotation of said inside surface guides and spreads said activated coating so that the activated coating is applied to the internal surface of the conduit.

17. A coating apparatus for applying an activated coating onto an internal surface of a conduit, the coating being activated by mixing at least a first component and a second component, said apparatus comprising:

a high-pressure mix gun for mixing the at least first and second components such that the activated coating is generated;

said high-pressure mix gun including:

a housing which defines a bore having a first end and a second end;

a rod having a first extremity and a second extremity, said rod slidably extending through said bore, said rod defining a mixing chamber for mixing together the at least first and second components, said rod being controllably movable axially along said bore so that said rod and said mixing chamber are controllably moved between a first disposition and a second disposition such that when said mixing chamber is in said first disposition, said mixing chamber is supplied with the at least first and second components so that the at least first and second components are mixed together within said mixing chamber for generating the activated coating such that a flow of the activated coating flows from said mixing chamber towards the internal surface of the conduit and when said mixing chamber is disposed in said second disposition thereof, said mixing chamber is disconnected from the at least first and second components so that said flow of the activated coating is inhibited thereby avoiding any need for purging the coating apparatus with inflammable and thus potentially lethal and environmentally polluting purging solvent;

a rotary atomizer operatively connected to and cooperating with said high pressure mix gun for receiving the activated coating from said high pressure mix gun, said rotary atomizer defining an inside surface of conical shaped configuration operatively disposed relative to said high pressure mix gun such that when said mixing chamber is disposed in said first disposition thereof, said inside surface of conical shaped configuration receives the activated coating from said high pressure mix gun so that said flow of the activated coating flows from said high pressure mix gun along said inside surface of conical shaped configuration such that the activated coating is applied to the internal surface of the conduit;

said high-pressure mix gun further including:
a first inlet defined by said housing;
a second inlet defined by said housing;
  said first inlet being in fluid communication with the first component;
  said second inlet being in fluid communication with the second component;
a body disposed axially spaced relative to said housing, said body defining an enclosure for the reception therein of said second extremity of said rod;
  said enclosure having an inner surface of cylindrical configuration;
a piston secured to said second extremity of said rod, said piston sealingly cooperating with said inner surface of said enclosure such that axial movement of said piston within said enclosure is permitted;
said enclosure has a first and a second compartment such that said piston is disposed between said first and a second compartments;
a source of pressurized fluid being selectively connected to said first compartment for moving said piston and said rod axially within said
enclosure such that said first extremity of said rod is disposed in said first disposition thereof for permitting said flow of activated coating;
  said source of pressurized fluid being selectively connected to said second compartment for moving said piston and said rod axially within said enclosure such that said first extremity of said rod is disposed in said second disposition thereof for inhibiting said flow of activated coating;
a first connector connected to said first compartment for connecting said first compartment to said source of pressurized fluid;
a second connector connected to said second compartment for connecting said second compartment to said source of pressurized fluid;
a control device disposed remote from said enclosure for selectively controlling connection of said source of pressurized fluid to said first and said second connectors for controlling axial movement of said rod between said first and said second dispositions thereof;
a first pump disposed remote from said first inlet of said high-pressure mix gun, said first pump having an inlet port and an outlet port, said outlet port of said first pump being connected to said first inlet of said high-pressure mix gun, said first pump pressurizing the first component to a said pressure within a range of 1500 to 3500 pounds per square inch;
a second pump disposed remote from said second inlet of said high-pressure mix gun, said second pump having a further inlet port and a further outlet port, said further outlet port of said second pump being connected to said second inlet of said high-pressure mix gun, said second pump pressurizing the second component to a said pressure within a range of 1500 to 3500 pounds per square inch;
said rotary atomizer further including:
  a rearward portion and a forward portion;
    said rearward portion of said rotary atomizer defines a recess which cooperates with and is supported by said high-pressure mix gun for permitting rotation of said rotary atomizer relative to said high-pressure mix gun, said rotary atomizer rotating about a longitudinal axis which extends through said high-pressure mix gun;
    said forward portion of said rotary atomizer defines an inside surface of conical shaped configuration;
    said conical shaped configuration of said inside surface of said forward portion having an apex which is disposed such that the activated coating generated by said high-pressure mix gun flows from said high-pressure mix gun through an aperture defined by said apex of said inside surface so that rotation of said inside surface guides and spreads said activated coating so that the activated coating is applied to the internal surface of the conduit;
  a bearing disposed between said recess of said rearward portion of said rotary atomizer and said high-pressure mix gun facilitating support of said rotary atomizer and rotation thereof about said high-pressure mix gun;
    said bearing includes:
      a first annular row of ball bearings;
      a second annular row of ball bearings disposed axially spaced relative to said first annular row of ball bearings;
  a motor drivingly connected to said rotary atomizer for rotating said rotary atomizer about said high-pressure mix gun;
said apparatus further including:
a drive shaft having a first and a second end, said motor being drivingly connected to said second end of said drive shaft;
a drive belt cooperating with said first end of said drive shaft such that said drive belt is driven by said drive shaft, said drive belt extending around said rotary atomizer such that said drive belt drivingly cooperates with said rotary atomizer for rotating the same about said high-pressure mix gun;
a plate for deflecting the activated coating towards said conical shaped configuration of said inside surface such that said apex is disposed between said plate and said high-pressure mix gun; and
said plate is secured to said forward portion of said rotary atomizer so that activated coating flows from said high-pressure mix gun through said aperture and is deflected and atomized by said plate onto said conical shaped configuration of said inside surface of said forward portion and so that rotation of said forward portion urges said atomized activated coating to move by centrifugal force and guided by said inside surface for application onto the internal surface of the conduit to be coated.

* * * * *